(12) United States Patent
Wright

(10) Patent No.: US 6,379,144 B1
(45) Date of Patent: Apr. 30, 2002

(54) REDUCTION IN DEFLECTION OF VALVE PIN IN INJECTION MOULDING APPARATUS

(75) Inventor: John B. Wright, Port McNicoll (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 09/358,060

(22) Filed: Jul. 21, 1999

(51) Int. Cl.[7] ............................................... B29C 45/17
(52) U.S. Cl. ........................ 425/562; 425/566; 425/570; 425/572
(58) Field of Search ................................. 425/562, 564, 425/566, 570, 572

(56) References Cited

U.S. PATENT DOCUMENTS

| | | | | |
|---|---|---|---|---|
| 4,932,858 A | * | 6/1990 | Gellert | 425/564 |
| 5,078,589 A | * | 1/1992 | Osuna-Diaz | 425/562 |
| 5,141,696 A | * | 8/1992 | Osuna-Diaz | 264/297.2 |
| 5,470,219 A | * | 11/1995 | Yokoyama et al. | 425/144 |

* cited by examiner

Primary Examiner—Nam Nguyen
Assistant Examiner—Emmanuel Luk
(74) Attorney, Agent, or Firm—Baker & Daniels

(57) ABSTRACT

An injection moulding apparatus includes a manifold having a channel receiving an injection of molten polymer and delivering the molten polymer to a nozzle assembly. The nozzle includes a nozzle gate delivering the molten polymer to a mould. A valve gate drop assembly has a valve pin extending from a valve pin cylinder which passes through an eccentric bushing in the manifold. The valve pin extends into the nozzle assembly and terminates at the nozzle gate. The valve pin is aligned with the nozzle gate and is adapted for control of flow of molten polymer through the nozzle gate by movement into and away from the nozzle gate. The movement of the valve pin is controlled by the valve pin cylinder. During operation, the manifold can undergo a change in position relative to the positions of the valve pin cylinder and nozzle assembly as a result of thermal expansion and contraction of the manifold. The eccentric bushing in the manifold rotates on change of position of the manifold generally to maintain alignment of the valve pin with the nozzle gate and reduce deflection of the valve pin caused by change of position of the manifold.

7 Claims, 3 Drawing Sheets

REDUCTION IN DEFLECTION OF VALVE PIN IN INJECTION MOULDING APPARATUS

FIELD OF THE INVENTION

The present invention relates to an injection moulding apparatus, and in particular to a valve gate drop assembly for an injection moulding apparatus. Specifically, the present invention relates to reduction in the deflection of a valve pin in the valve gate drop assembly during movement of the manifold resulting from thermal expansion and contraction of the manifold.

BACKGROUND OF THE INVENTION

One method for the manufacture of articles from thermoplastic polymers involves injection of molten polymer through a nozzle into a mould. The molten polymer is fed from a source of molten polymer, typically an extruder, into the inlet of a manifold and then transferred through one or more channels in the manifold towards nozzle assemblies. Each nozzle assembly is normally oriented at a substantial angle to the manifold, most commonly at about 90°, and has a channel for molten polymer communicating with a channel in the manifold. Each nozzle assembly also includes a nozzle gate connected to the cavity of the mould for the article that is to be manufactured.

During the moulding cycle, molten polymer entering a nozzle assembly from the manifold is injected through its nozzle gate into the mould. After the mould has been filled with molten polymer, the mould is cooled to solidify the polymer so that when the mould is opened to remove the article, the moulded article retains its shape and does not undergo distortion.

The channels in the manifold and nozzle assemblies contain molten polymer under pressure even during the steps in the injection moulding cycle when molten polymer is not being injected into moulds. Thus, it is necessary to prevent flow of molten polymer through the nozzle gates at certain stages in the moulding cycle. It is also necessary to control the amount of molten polymer that flows into the moulds during the injection stage of the moulding cycle. This is achieved by use of a valve gate drop assembly for each nozzle assembly. Each valve gate drop assembly has a valve pin extending from a valve pin cylinder. The valve pin passes through the manifold and extends into the nozzle assembly terminating at the nozzle gate. Control of flow of molten polymer is achieved by raising and lowering the valve pin. Retracting the valve pin from the nozzle gate permits flow of molten polymer into the mould while re-inserting the valve pin into the nozzle gate prevents further flow of molten polymer into the mould. The movement of the valve pin is controlled by the valve pin cylinder, which may be, for example, a pneumatic or hydraulic system that raises and lowers the valve pin.

The intermittent flow of molten polymer through the manifold and nozzle assemblies, the cooling of the moulds to effect removal of the moulded articles and the subsequent re-heating and control of the temperature for injection of molten polymer, results in temperature changes in the valve gate drop assemblies, the nozzle assemblies, and the manifold. The required temperatures and control of such temperatures are achieved using heaters in the manifold and/or nozzle assemblies.

The heating, cooling and temperature control of the manifold and nozzle assemblies, including start up and shut down of the injection moulding apparatus, results in some thermal expansion and contraction of the manifold and nozzle assemblies. Relative changes in position of the manifold and nozzle assemblies apply stress to the valve pins, which pass through the manifold and extend into the nozzle assemblies, with the consequence that the valve pins tend to be forced away from alignment with the nozzle gates i.e. be deflected. This can lead to bending and damage of the valve pins which in turn can result in damage to the nozzle gates. Bending of the valve pins and damage to the nozzle gates can lead to loss of control of flow of molten polymer through the nozzle gates e.g. by poor seating of the valve pins in the nozzle gates and/or changes in timing of closing of the nozzle gates. This of course can lead to process problems such as polymer drool at the nozzle gates or inconsistent injection of molten polymer into the moulds.

The nozzle assemblies, valve gate drop assemblies and manifold may be bolted together, so that there is no relative movement in the positions of the valve pin cylinders, manifold and nozzle assemblies on change in temperature. However, this can lead to stress in other parts of the injection moulding apparatus and creates increased heat loss. An alternative is to permit the manifold to float in position with respect to both the valve pin cylinders and the nozzle assemblies. In other words, the manifold is not bolted to the valve pin cylinders or to the nozzle assemblies, in which case there is a tendency for the valve pins to be deflected from alignment and become distorted or bent as the manifold undergoes thermal expansion and contraction.

It is therefore an object of the present invention to provide a novel valve gate drop assembly for an injection moulding apparatus and an injection moulding apparatus incorporating the same.

SUMMARY OF THE INVENTION

The present invention provides a valve gate drop assembly for an injection moulding apparatus in which deflection of the valve pin from alignment may be reduced during movement of the manifold relative to the nozzle assembly resulting from thermal expansion and contraction.

Accordingly, one aspect of the present invention provides an injection moulding apparatus comprising:

a manifold having a channel receiving an injection of molten polymer and delivering said molten polymer to a nozzle assembly, said nozzle assembly including a nozzle gate adapted to be connected to a mould to deliver molten polymer thereto and;

a valve gate drop assembly having a valve pin extending from a valve pin cylinder through said manifold and into said nozzle assembly, said valve pin being aligned with said nozzle gate and adapted for control of flow of molten polymer through said nozzle gate by movement into and away from said nozzle gate, movement of said valve pin being controlled by said valve pin cylinder, said manifold undergoing a change in position relative to the positions of the valve pin cylinder and nozzle assembly on thermal expansion and contraction of the manifold, said valve pin passing through an eccentric bushing in said manifold, said eccentric bushing rotating on change of position of the manifold generally to maintain alignment of said valve pin with said nozzle gate thereby to reduce deflection of said valve pin caused by said change of position of the manifold.

According to another aspect of the present invention there is provided in an injection moulding apparatus including a manifold having a channel feeding molten polymer to a nozzle assembly for subsequent delivery to a mould, said manifold and nozzle assembly undergoing relative movement as a result of thermal expansion and contraction of said manifold, a valve gate assembly comprising:

a valve pin extending through said manifold and into said nozzle assembly;

a drive acting on said valve pin to move said valve pin between an extended position where said valve pin seals said nozzle assembly and a retracted position where molten polymer can flow from said nozzle assembly to said mould; and a rotatable element accommodated by said manifold and through which said valve pin passes, said rotatable element rotating within said manifold upon movement of said manifold as a result of thermal expansion and contraction generally to maintain alignment of said valve pin and said nozzle assembly thereby to reduce deflection of said valve pin.

Preferably the rotatable element is an eccentric bushing that rotates up to about 20° during expansion and contraction of the manifold. It is also preferred that the drive includes a valve pin cylinder having a piston acting on the valve pin.

The present invention provides advantages in that since the nozzle assembly is allowed to float with respect to the manifold while inhibiting deflection of the valve pin, the amount of stress applied to components of the injection moulding apparatus is reduced while maintaining adequate process control.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
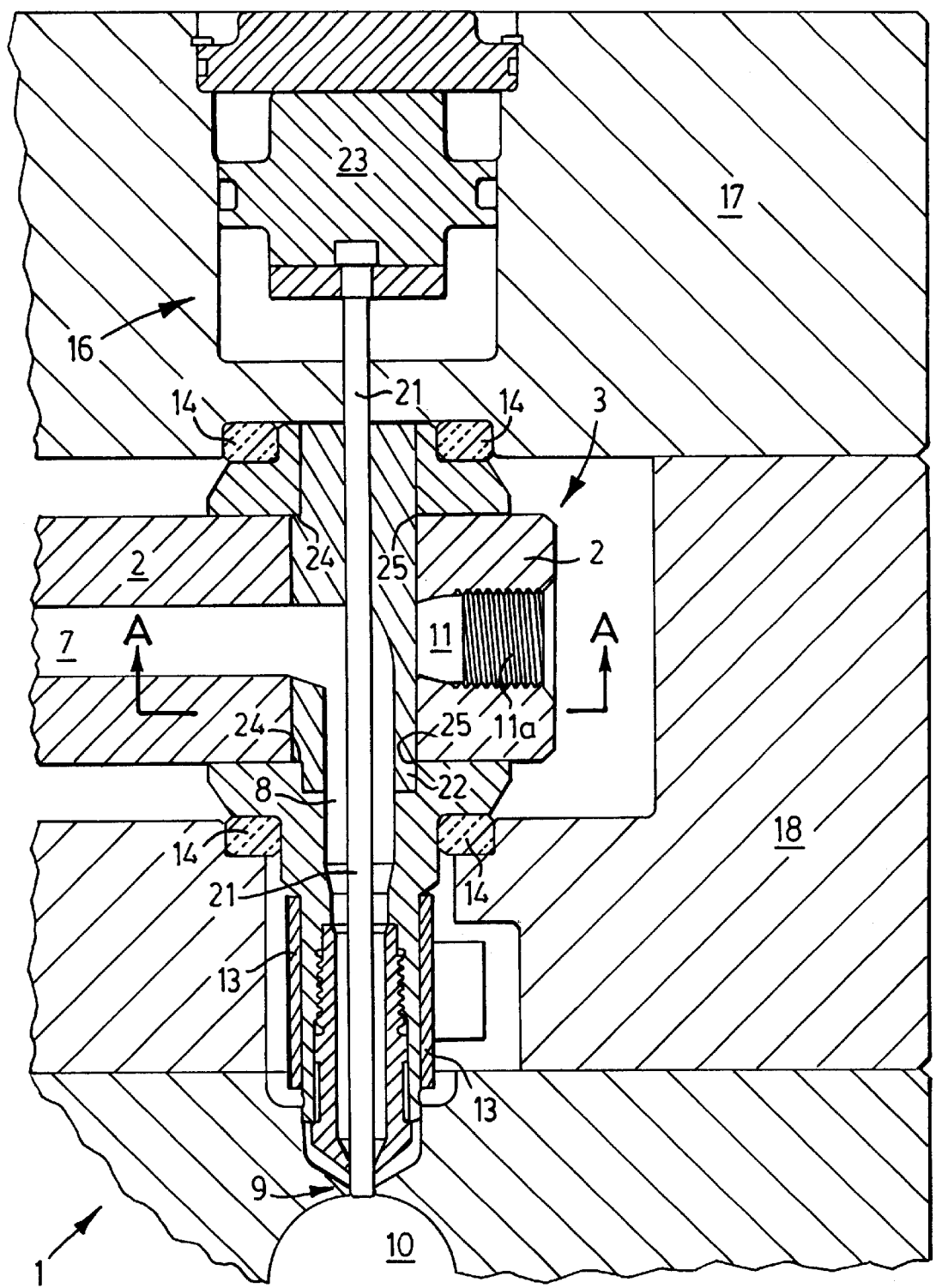
FIG. 1 is a schematic representation of a portion of a hot runner for an injection moulding machine including a manifold and a valve gate drop assembly, when cold.

Turning now to FIG. 1, a portion of a hot runner, generally indicated by reference numeral 1, for an injection moulding apparatus is shown when the hot runner is cold. Hot runner 1 has a manifold 2 and a nozzle assembly 3. The manifold 2 includes a manifold channel 7 that communicates with a nozzle channel 8 and a nozzle gate 9 in the nozzle assembly 3. A mould 10 is disposed below the nozzle gate 9. Although not shown, manifold channel 7 communicates with a sprue channel in a sprue bushing. Sprue channel communicates with an injection port into which molten polymer is injected thereby to allow molten polymer to be injected into the manifold channel 7.

Manifold channel 7 extends past the nozzle channel 8. A channel plug 11 is disposed in the manifold channel and is retained by a set screw 11a or weld or both so that molten polymer injected into the manifold channel 7 is directed to the nozzle channel 8. Manifold 2 is provided with manifold heaters (not shown), and similarly nozzle assembly 3 is provided with nozzle heaters 13. Insulation 14 separates the nozzle assembly 3 and the top and bottom plates 17 and 18 respectively of the injection moulding apparatus.

A valve gate drop assembly is aligned with the nozzle assembly 3 and includes a valve pin cylinder 16 located above manifold 2. A solid metallic valve pin 21 extends from valve pin cylinder 16 through the top plate 17 and into an eccentric bushing 22 (see FIG. 3) located in manifold 2. Bushing 22 is rotatable within the manifold 2 and has a passage provided therethrough, which communicates with the manifold channel 7, as well as the nozzle channel 8. Valve pin 21 passes through bushing 22 and then extends into the nozzle channel 8 where it terminates at the nozzle gate 9. Valve pin cylinder 16 has a piston 23, which is connected to valve pin 21. It is to be noted that the junction of bushing 22 and nozzle assembly 3 shows a first shoulder 24, but absence of a second shoulder 25 when the hot runner 1 is cold. The hot runner 1 is particularly characterized in that manifold 2 floats with respect to the valve gate drop assembly and nozzle assembly 3 i.e. manifold 2 is not bolted to nozzle assembly 3 or to valve pin cylinder 16 and is capable of movement with respect to both the nozzle assembly 3 and valve pin cylinder 16 especially as a result of thermal expansion and contraction.

Figure 2:
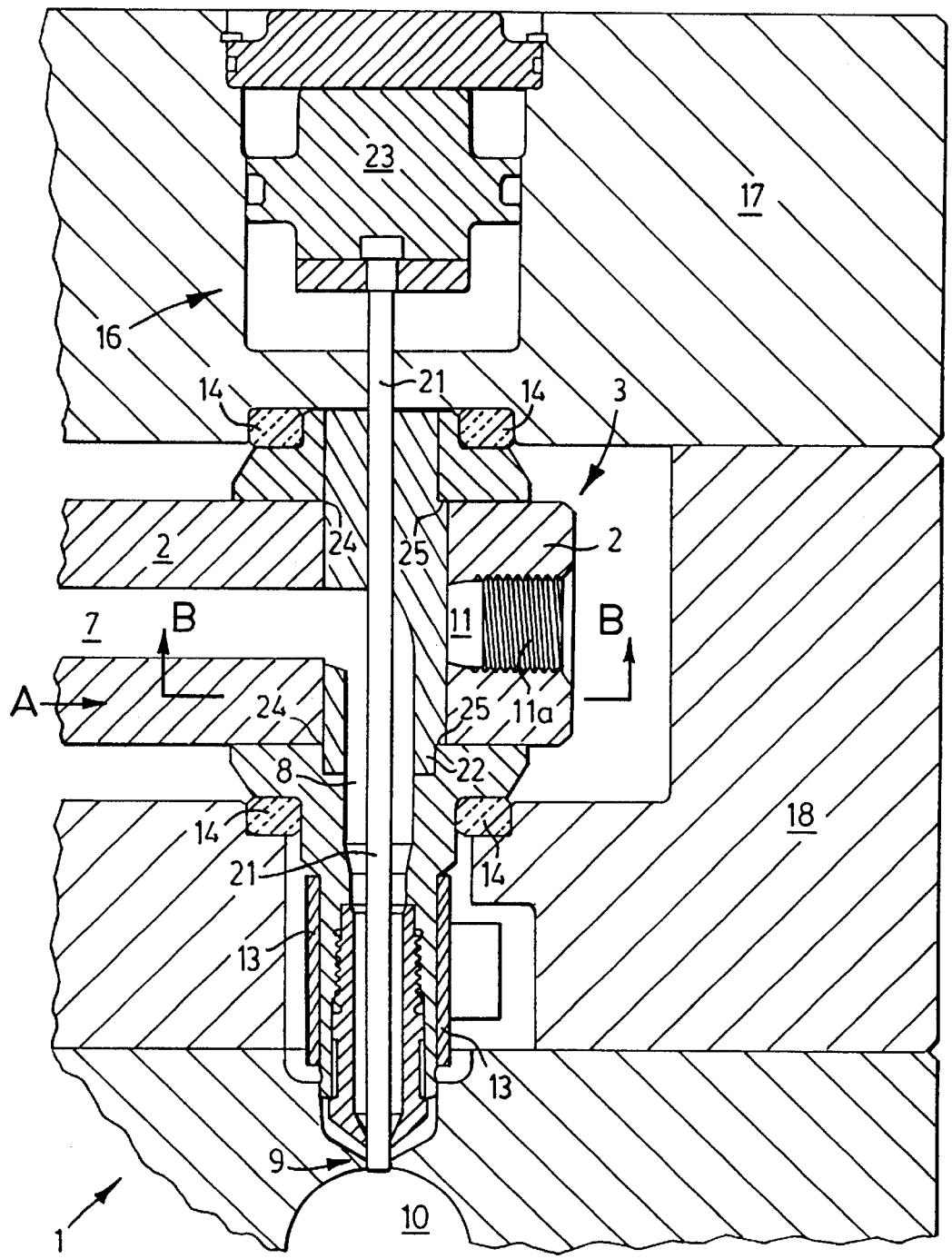
FIG. 2 is a schematic representation of the valve gate drop assembly of FIG. 1, when hot.

FIG. 2 shows the valve gate drop assembly when the hot runner 1 is hot. It will be noted that manifold 2 has changed its position relative to nozzle assembly 3 by thermal expansion towards the right, as indicated by the arrow A resulting in rotation of the bushing 22. First shoulder 24 shown in FIG. 1 is now essentially absent, whereas the second shoulder 25 has been formed.

The change in position of manifold 2 with respect to nozzle assembly 3 and valve pin cylinder 16 that has the most significant effect on the valve pin 21 occurs when the injection moulding machine is shut down. It has been found that the manifold 2 will shrink by about 0.0025 to 0.003 inches for each inch of its length. As will be appreciated, for long manifolds the amount of shrinkage can be significant. Similar changes in position, but to a substantially smaller amount, in the same direction or in the opposite direction may occur during normal heating of hot runner 1 and control of that heating to maintain manifold 2 and nozzle assembly 3 at the operational temperature.

In operation, molten polymer is injected into hot runner 1 at the injection port and passes down sprue channel to the manifold channel 7. From the manifold channel 7, the molten polymer passes through the bushing 22 to nozzle channel 8. The molten polymer is maintained in hot runner 1 under pressure, and at a predetermined temperature using the manifold and nozzle heaters. The injection moulding process is operated using a moulding cycle, in which molten polymer is injected into the mould 10 through the nozzle gate 9 for part of the cycle, followed by cooling of the mould. When the mould has been cooled sufficiently, so that the article will retain its integrity, the mould 10 is opened and the moulded article is ejected. The mould is then closed, at which time the mould 10 and hot runner 1 are re-heated to the predetermined temperature prior to injection of molten polymer at the commencement of the next cycle of the process.

The injection of molten polymer into the mould involves retraction of valve pin 21 from nozzle gate 9. The molten polymer, which is under pressure, is then injected into the mould. The time of injection of polymer, which also relates to the amount of molten polymer that is injected must be controlled, in order to have control over the process and moulded articles, especially so that the moulded articles will be consistent. Thus, the timing of retraction of valve pin 21 from nozzle gate 9 and the timing of the subsequent return of valve pin 21 into nozzle gate 9 to stop flow of molten polymer are important. Valve pin 21 is seated in nozzle gate 9 at those times of the injection moulding cycle when molten polymer does not flow through manifold channel 7, nozzle channel 8 and into mould 10.

In order to effect injection of molten polymer into mould 10, piston 23 is raised by valve pin cylinder 16 thereby to retract valve pin 21 from nozzle gate 9 and permit the injection of molten polymer into the mould 10. The reverse occurs at the end of the injection cycle in order to stop further flow of molten polymer. Since the valve pin cylinder 16 is aligned with nozzle gate 9, changes in position of manifold 2 may cause valve pin 21 to become distorted and deflected out of alignment. This may cause valve pin 21 to become bent. A bent valve pin 21 may not retract in the same manner as a straight valve pin, with consequent effects on the injection of molten polymer into the mould during a moulding cycle and the seating of valve pin 21 in nozzle gate 9 during other stages of the cycles. The latter can lead to drool of molten polymer, and the need to clean the nozzle gate and/or the mould.

To deal with this problem, the eccentric bushing 22 is provided in the manifold 2. The eccentric bushing is rotatable with respect to the manifold 2 and nozzle assembly 3 when the manifold undergoes thermal expansion and contraction. During rotation of the eccentric bushing, the passage through the bushing for the valve pin 21 remains aligned with the nozzle channel 8 and nozzle gate 9. As a result, the valve pin is not subjected to any appreciable deflection.

Figure 3:
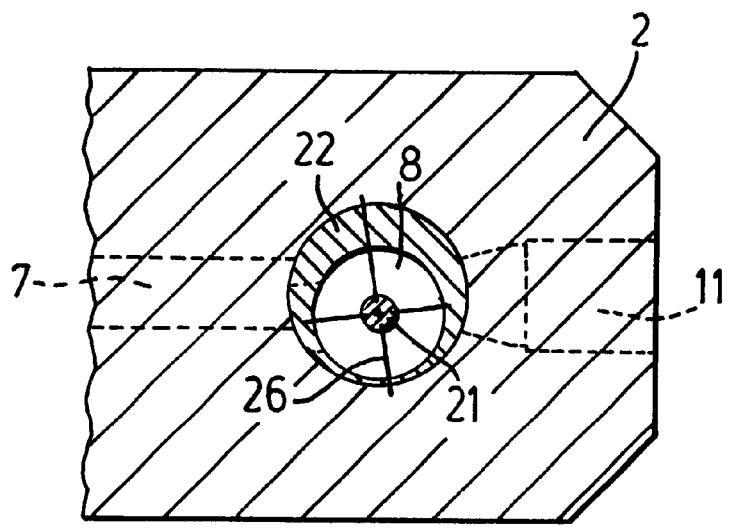
FIG. 3 is a cross-section of FIG. 1 taken along line A—A.

FIG. 3 is a cross-section of FIG. 1 taken along line A—A and shows the bushing 22 when the hot runner is cold. It will be noted that the diameter identified by reference number 26 is oriented at an angle of approximately NNW, as viewed on the drawing.

Figure 4:
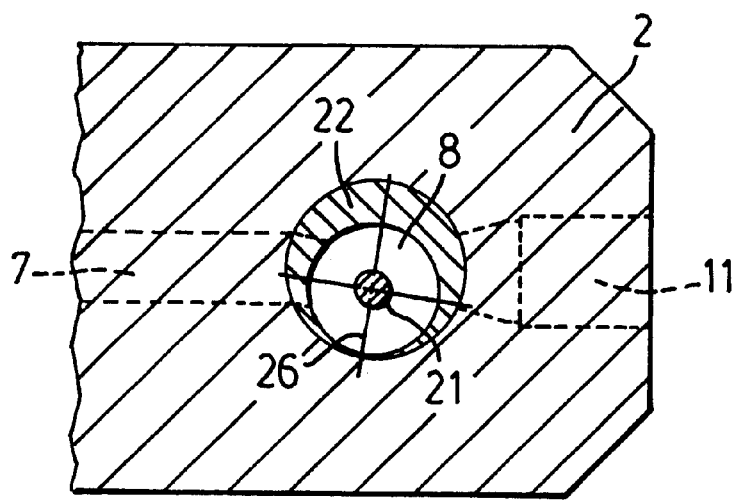
FIG. 4 is a cross-section of FIG. 2 taken along line B—B.

FIG. 4 is a corresponding cross-section of FIG. 2 taken along line B—B and shows the bushing 22 when the hot runner is hot and the manifold 2 has undergone thermal expansion. It will be noted that the eccentric bushing 22 has rotated, such that the diameter 26 corresponding to that of FIG. 3 is now oriented at an angle of approximately NNE as viewed. Thus, the change in position of the manifold 2 with respect to the nozzle assembly 3 and the valve pin cylinder 16 has caused bushing 22 to rotate so as to maintain the alignment of the valve pin with the nozzle gate 9. This inhibits deflection of valve pin 21. During thermal expansion and contraction of the manifold 2, when the injection moulding apparatus is started up or shut down, the bushing 22 typically rotates through between about 10° to 20°. Consequently, the valve gate drop assembly operates more effectively and consistently over extended periods of time as compared to a conventional valve gate drop assembly.

The present invention is believed to alleviate problems caused by deflection and bending of the valve gate pin in a valve gate drop assembly for an injection moulding apparatus where the manifold is capable of movement relative to the nozzle assembly as a result of thermal expansion and contraction.

Although a preferred embodiment of the present invention has been described, those of skill in the art will appreciate that variations and modifications may be made without departing from the spirit and scope thereof as defined by the appended claims.

I claim:

1. An injection moulding apparatus comprising:

a manifold having a channel receiving an injection of molten polymer and delivering said molten polymer to a nozzle assembly, said nozzle assembly including a nozzle gate adapted to be connected to a mould to deliver molten polymer thereto and;

a valve gate drop assembly having a valve pin extending from a valve pin cylinder through said manifold and into said nozzle assembly, said valve pin being aligned with said nozzle gate and adapted for control of flow of molten polymer through said nozzle gate by movement into and away from said nozzle gate, movement of said valve pin being controlled by said valve pin cylinder, said manifold undergoing a change in position relative to the positions of the valve pin cylinder and nozzle assembly due to thermal expansion and contraction of the manifold, said valve pin passing through an eccentric bushing in said manifold, said eccentric bushing rotating on change of position of the manifold generally to maintain alignment of said valve pin with said nozzle gate thereby to reduce deflection of said valve pin caused by said change of position of the manifold.

2. An injection moulding apparatus as defined in claim 1 wherein said eccentric bushing rotates up to about 20° during expansion and contraction of said manifold.

3. In an injection moulding apparatus including a manifold having a channel feeding molten polymer to a nozzle assembly for subsequent delivery to a mould, said manifold and nozzle assembly undergoing relative movement as a result of thermal expansion and contraction of said manifold, a valve gate drop assembly comprising:

a valve pin extending through said manifold and into said nozzle assembly;

a drive acting on said valve pin to move said valve pin between an extended position where said valve pin seals said nozzle assembly and a retracted position where molten polymer can flow from said nozzle assembly to said mould; and a rotatable element accommodated by said manifold and through which said valve pin passes, said rotatable element rotating within said manifold upon movement of said manifold as a result of thermal expansion and contraction generally to maintain alignment of said valve pin and said nozzle assembly thereby to reduce deflection of said valve pin.

4. A valve gate drop assembly as defined in claim 3 wherein said rotatable element is an eccentric bushing.

5. A valve gate drop assembly as defined in claim 4 wherein said drive includes a valve pin cylinder having a piston acting on said valve pin.

6. A valve gate drop assembly as defined in claim 5 wherein said cylinder is pneumatic.

7. A valve gate drop assembly as defined in claim 4 wherein said eccentric bushing rotates up to about 20° during expansion and contraction of said manifold.

* * * * *